United States Patent Office.

R. O. LOWREY, OF SALEM, NEW YORK.

Letters Patent No. 89,055, dated April 20, 1869; antedated March 23, 1869.

IMPROVEMENT IN THE MANUFACTURE OF WATER-PROOF AND WATER-REPELI

The Schedule referred to in these Letters Patent and making part of the same.

*To all whom it may concern:*

Be it known that I, R. O. LOWREY, of Salem, in the county of Washington, and State of New York, have invented certain new and useful Improvements in Water-Proof Repellent Fluids; and I do hereby declare that the following is a full, clear, and exact description thereof.

To enable others skilled in the art to construct and use my invention, I will proceed to describe it.

My invention relates to composition of matter of a new and useful character; and consists in making an artificial gum, and combining it with certain volatile liquids, as hereinafter described, by which I produce a fluid possessing strong repellent water-proof qualities, which render it extremely useful for many purposes hereinafter stated.

I first make an artificial gum, by dissolving a certain quantity of soap in water, then boiling the solution, and while boiling add a quantity equal by weight to about one-half of the weight of the soap, of any alums, or sulphates, or acetates, either alone or in combination with any chlorides or substances possessing a saline quality.

As these salts dissolve and combine with the soapy solution, an insoluble compound will rise to the surface, and assume a lumpy or granular form, which I remove by skimming or straining, and afterward free from any water that may be adhering to it, by drying, pressing, or by any other convenient process.

For the purpose of making this gum, I have found that the proportions of the soap and alums or salts may be varied without materially affecting the result.

The artificial gum thus made, I pulverize or reduce to fineness in any convenient way, by pounding or grinding, and place it, when pulverized, in some suitable vessel, constructed so as to be closed air-tight, and then add a quantity of any readily evaporating or volatile liquid, as benzole, benzine, turpentine, caracine-oil, chloroform, bisulphide of carbon, or any simil stances that will dissolve and hold the gum in s( mix them together, close the vessel, and allow tl ture to stand until the solution becomes perfec The mixture or composition thus made will b to possess strong water-proof repellent qualiti I call it my improved repellent fluid.

It will be found very useful for many purposes rics saturated with it will be given a strong re water-proof quality. Instead of saturating the the fluid may be applied by a sponge or bru similar results.

It makes excellent water-proofing for clotl for fur and woollen hats, gloves, and similar ; and may also be usefully employed as a wate dressing for leather of all kinds, as well as for especially such as is used for important docum is likely to be exposed to the action of water.

I have also found that it makes a good si stone, wood, and similar materials, where it i able to prevent the absorption of water or pai It may also be usefully mixed with drying-( used for painting, and may be given any desir by any pigments suitable for the purpose.

It is obvious that the artificial gum, made a described, may be mixed with other gums, or or waxes, or grease, by melting, and then th afterward dissolved and mixed with the volatile as described.

Having thus described my invention,
What I claim, is—

A water-proof repellent fluid, consisting of ficial gum, made as herein described, in coml with benzole, benzine, or similar volatile liqui stantially as herein set forth.

Witnesses:                                     R. O. LOW.
   J. McKENNEY,
   P. T. DODGE.